Figure 1:
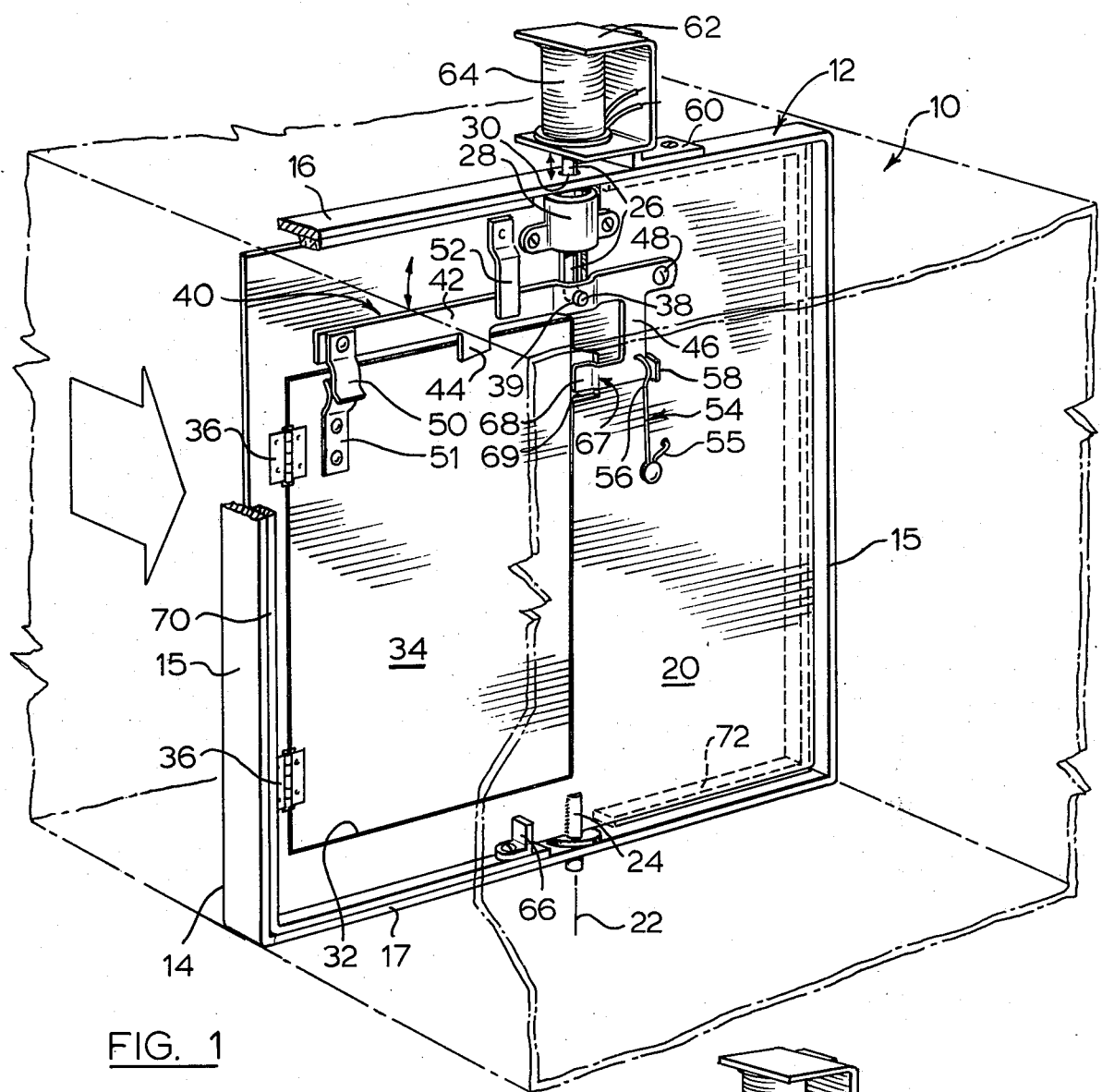

United States Patent [19]
Wilson

[11] 3,993,096
[45] Nov. 23, 1976

[54] DAMPER CONSTRUCTION

[75] Inventor: Wilfred W. Wilson, Mississauga, Canada

[73] Assignee: K.S.H. Canada Ltd., Bramalea, Canada

[22] Filed: July 15, 1975

[21] Appl. No.: 596,080

[52] U.S. Cl. .......................... 137/599.2; 137/512.1; 137/512.2; 98/41 R
[51] Int. Cl.[2] ........................................ F16K 11/10
[58] Field of Search ........... 137/512.1, 512.2, 599.2; 98/41 R

[56] References Cited
UNITED STATES PATENTS

| | | | |
|---|---|---|---|
| 2,035,191 | 3/1936 | Reynolds | 137/599.2 |
| 3,344,808 | 10/1967 | Cary | 137/599.2 |

*Primary Examiner*—Robert G. Nilson
*Attorney, Agent, or Firm*—Sim & McBurney

[57] ABSTRACT

This invention provides a damper construction for forced-air systems in which the damper may be opened and closed by means of a solenoid or equivalent component against a wide range of volumes and velocity. The main damper panel has a window to one side of an intermediate pivot axis, and a flap hinged to the panel and adapted to close and open the window in either direction across the panel. An air pressure differential across the panel exerts a greater turning moment on the flap side than on the other side when the flap is closed, and exerts a smaller turning moment on the flap side than on the other side when the flap is opened. Flap control means are provided which are switchable to allow the flap to act as a one-way valve in one direction across the panel, or as a one-way valve in the opposite direction of the panel.

9 Claims, 6 Drawing Figures

U.S. Patent  Nov. 23, 1976  Sheet 1 of 2  3,993,096

DAMPER CONSTRUCTION

This invention relates generally to air-control systems, and has to do particularly with the construction and operation of an air duct damper especially for use in buildings which utilize forced air for heating, cooling or both.

Conventional air-control dampers are typically of the butterfly-valve type, and are rotated between a closed position and an open position by means of a motor. Where a cooling or heating system for a building requires individual control of air flow into specific areas or rooms of the building in order to control the temperature or air conditions in those areas, it is necessary to supply a large number of individual dampers together with the motors necessary to operate the dampers. Each motor-operated damper is controlled by a thermostat located in the room or area to which air is delivered through the damper. The thermostat may be a simple "on-off" thermostat which instructs the motor either to fully open or to fully close the damper, or in more complicated systems may be capable of controlling the motor in such a way that the damper may be adjusted to a number of specific intermediate positions between the "closed" and the "open" positions.

One of the disadvantages with this conventional mode of air control relates to the very high cost involved in supplying an electric motor for each of the dampers in the system.

It is with the foregoing disadvantage of conventional air-control systems in mind that the present invention has been developed.

In general terms, the damper construction provided herein is such as not to require an electric motor for its operation. The damper structure may be actuated between an open and a closed position merely by the electrical activation of a solenoid or equivalent component.

More specifically, this invention provides a damper for air ducts, comprising frame means, a panel rotatable between a closed position and an open position about an intermediate axis fixed with respect to the frame means, the panel having, mainly to one side of said axis, a window adapted to be closed and opened by a flap pivoted to said panel, such that any air pressure differential across said panel exerts a turning moment on the panel portion to said one side of said axis which is greater than that exerted on the panel portion to the other side when the window is closed, and is less when the window is open, and flap control means selectively switchable to allow the flap to act as a one-way valve in one direction across the panel, or as a one-way valve in the opposite direction across the panel.

Figure 2:
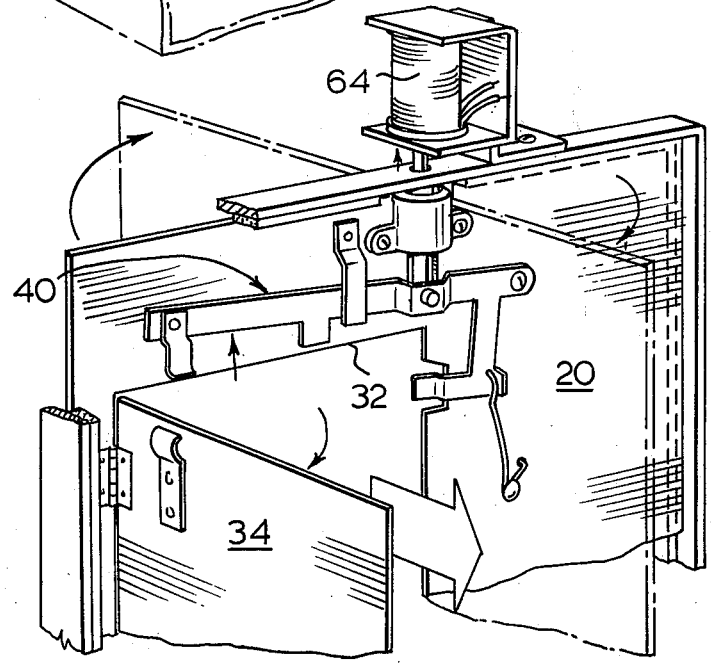

One embodiment of this invention is illustrated in the accompanying drawings, in which like numerals denote like parts throughout the several views, and in which:

FIG. 1 is a partly broken-away perspective view of a damper constructed in accordance with this invention, the damper being in its closed position;

FIG. 2 is a partial perspective view similar to that of FIG. 1, showing in solid lines the damper at an intermediate stage of its activation prior to shifting to the open position, and in broken lines a further stage in the opening of the same; and FIGS. 3 to 6 are sequential horizontal sectional views illustrating sequential stages in the opening of the damper and the first stage of the closing of the damper.

Turning first to FIG. 1, there is illustrated in broken lines an air duct 10 of substantially rectangular configuration, in which is mounted a damper 12 according to this invention. The damper includes a frame 14, also of rectangular construction, and adapted to fit snugly within the duct 10 and to be affixed thereto by conventional means. The frame 14 includes two upright side members 15, a top member 16, and a bottom member 17.

Located within the opening defined by the frame 14 is a damper panel 20 which is rotatable about an intermediate axis 22 which is fixed with respect to the frame 14. The construction defining the axis 22 includes a first pin 24 secured at its upper end to the damper panel 20 and extending downwardly therefrom in registry with a suitably sized aperture in the bottom member 17 of the frame 14. The axis 22 is further defined by a second slidable pin 26 which extends snugly but slidably through a guide sleeve 28 bolted to the damper panel 20 and thus fixed with respect thereto. The second slidable pin 26 passes upwardly through an aperture 30 in the top member 16 of the frame 14 which thus determines the location of the upper end of the axis 22.

To one side of the axis 22 (the left-hand side as seen in FIG. 1), the damper panel 20 has a window 32 which is adapted to be closed and opened by a flap 34 which is pivotally hinged to the panel 20 by hinges 36. As can be seen, both the panel and the flap are of rectangular construction, and the hinges 36 are located along an edge of the flap which is remote from the axis 22. The flap 34 is dimensioned to almost fully occupy the window 32, except for a very small tolerance which is such as to permit the flap 34 to swing to either side of the panel 20 as may be called for during the operation of the damper, and as will be hereinafter explained more fully.

Returning to the slidable pin 26, it will be seen that this pin has, at its lower end, a hook portion 38 which registers with a suitably dimensioned opening 39 in a pivotal member shown generally by the numeral 40 and constituting part of the flap control means which is now to be described.

The pivotal member 40 is shaped and positioned so as to be movable between two positions. In one position it permits the flap 34 to act as a one-way valve in one direction across the panel 20, while in the other position it permits the flap 34 to act as a one-way valve in the other direction across the panel 20.

More particularly, the pivotal member 40 has an elongated body portion 42 which in turn has a first finger 44 and a second finger 46, both depending downwardly therefrom. As can be seen, the second finger 46 is L-shaped, and extends downwardly and then toward the flap 34. The elongated body portion 42 of the pivotal member 40 is mounted for swinging motion with respect to the damper panel 20 about a pivot pin 48. As can be seen, the opening 39 with which the hook portion 38 of the pin 26 registers is located intermediate the pivot pin 48 and the first finger 44. Also secured to the elongated body portion 42, at the end remote from the pivot pin 48, is a spring finger 50 which is adapted to coact with a spring member 51 riveted or otherwise secured to the flap 34 in the position shown.

A guide member 52 is riveted or otherwise secured to the panel 20 and extends outwardly and then downwardly parallel with the panel 20 to define a guide slot adapted to receive the elongated body portion 42 of the pivotal member 40 and maintain the latter always in close juxtaposition with the panel 20.

A resilient spring 54 is secured to the panel 20 and has a fixed end 55 registering with an aperture in the panel 20 and a free end 56 bearing rightwardly against a tab 58 projecting outwardly (normal to the panel 20) from the elbow of the L-shaped second finger 46 of the pivotal member 40.

Finally, mounted atop the top member 16 of the frame 14 is a first bracket 60 of L-shaped configuration, which in turn supports a C-shaped second bracket 62, which in turn supports a solenoid coil 64. The second slidable pin 26 has at its upper end (not shown) a ferromagnetic pin member extending partly into the hollow center core of the solenoid coil 64, such that electrical activation of the solenoid coil 64 will draw the pin 26 upwardly, thereby causing the pivotal member 40 to pivot in the clockwise direction (as seen in FIG. 1) about the pivot pin 48. FIG. 2 shows the pivotal member 40 in the position it assumes upon electrical activation of the solenoid 64.

The position of the pivotal member 40 in FIG. 1 will be referred to hereinafter as the "first position," while the position shown in FIG. 2 will be referred to as the "second position."

Figure 5:
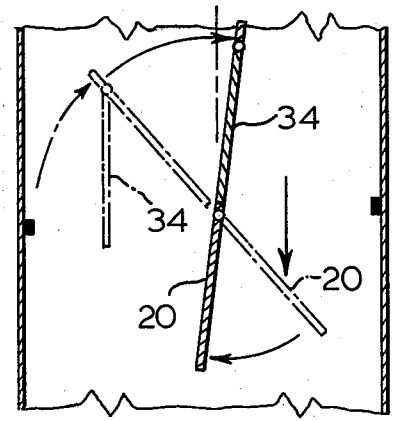

A stop member 66 is provided on the bottom member 17 of the frame 14 just to the left of the pin 24, for the purpose of limiting the arc through which the panel 20 is permitted to rotate between the closed position shown in FIG. 1 and its fully open position (shown in FIG. 5).

As can be seen in FIG. 1, the second finger 46 is bent in an offset at 67 in such a way that its terminal portion 68 lies in a plane which is on the other side of the general plane of the panel 20, and such that the terminal portion 68 is adapted to slide in behind the flap 34 when the flap 34 is in its closed position and co-planar with the panel 20, and when the solenoid 64 is activated to cause upwardly pivoting of the elongated body portion 42 and leftward movement of the terminal portion 68. The panel 20 is cut away at 69 to allow for portion 68.

It will thus be seen that the first finger 44 is situated in such a way as to permit one-way opening of the flap 34 in the direction away from the viewer in FIG. 1 when the pivotal member 40 is in its first position (the position of FIG. 1), but restrains movement in the direction toward the viewer in FIG. 1 when the pivotal member 40 is in its first position. Similarly, the terminal portion 68 of the second finger 46 is so arranged that, when the pivotal member 40 moves to its second position as seen in FIG. 2, the terminal portion 68 permits the flap 34 to open toward the viewer as seen in FIG. 2, but restrains and prevents opening of the flap 34 in the direction away from the viewer in FIG. 2. Thus, the flap 34 acts either as a one-way valve in one direction across panel 20 or as a one-way valve in the opposite direction across panel 20, depending upon whether the pivotal member 40 is in its first position or in its second position.

The operation of the damper described above is as follows.

It is assumed that the normal movement of air in the duct 10 is from left to right as seen in FIGS. 1 and 2 (i.e. from the remote side to the near side of the panel 20), and is from top to bottom in all of FIGS. 3 – 6. When the solenoid 64 is not electrically energized, the spring 54 and the weight of the member 40 will cause it to drop down into its first position, which is that shown in FIG. 1. In this position the first finger 44 extends downwardly in front of the flap 34 and the terminal portion 68 of the second finger 46 is withdrawn out of the way of the flap 34. Also, the spring finger 50 bears against the spring member 51 and gently urges the flap 34 in the opening direction away from the viewer in FIG. 1. However, the urging exerted by the spring finger 50 is not sufficient to actually open the flap 34 against the normal prevailing pressure of air in the duct upstream of the damper. For this reason, the flap 34 remains closed and co-planar with the panel 20. As can be seen in FIG. 1, a resilient sealing strip 70 is affixed to the leftward side member 15 and half of each of the top and bottom members 16 nd 17 in a position which limits the counterclockwise rotation of the panel 20 as seen from above, while a further resilient sealing strip 72 is positioned against the rightward side member 15 and the other halves of the top and bottom members 16 and 17, also in a position to limit the counterclockwise movement of the panel 20 as seen from above. Thus, the only direction in which the panel 20 can rotate from its position shown in FIG. 1 is in the clockwise sense as seen from above.

The panel 20 and flap 34 are so constructed that any air pressure differential across the damper exerts a turning moment on the panel portion to the left side of the axis 22 which is greater than that exerted on the panel portion to the other side of the axis 22 when the flap 34 closes the window 32. However, the turning moment on the panel portion to the left of the axis 22 when the window is open is less than that exerted on the panel portion to the right of the axis 22. Thus, when the flap 34 closes the window 32, the net effect of upstream air pressure against the full panel 20 (including the flap 34) is counterclockwise as seen from above, thus tending to urge the full panel (including the flap 34) into the closed position, which is that shown in FIG. 1.

When the solenoid 64 is electrically activated, it causes the pin 26 to be pulled upwardly, which in turn causes the pivotal member 40 to swing upwardly (clockwise as seen in FIG. 1) about the pivot pin 48, thus withdrawing both the first finger 44 and the spring finger 50 from engagement and interference with the flap 34, and at the same time injecting the terminal portion 68 of the L-shaped second finger 46 behind (i.e. upstream) of the flap 34. Since the terminal portion 68 of the finger 46 is injected upstream of the flap 34, there is nothing to prevent the flap 34 from opening toward the viewer in FIG. 1, which is what happens under the pressure of the air upstream of the damper. However, as soon as the flap 34 opens by swinging toward the viewer in FIG. 1, the turning moment exerted by the upstream air pressure against the portion of the panel 20 to the left of the axis 22 becomes less than that exerted against the portion of the panel 20 to the right of axis 22, and this immediately results in a clockwise rotation of the panel 20 as seen from above.

Figure 3:
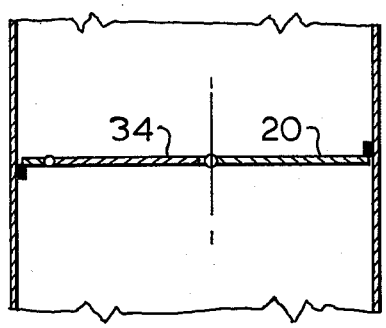
Figure 4:
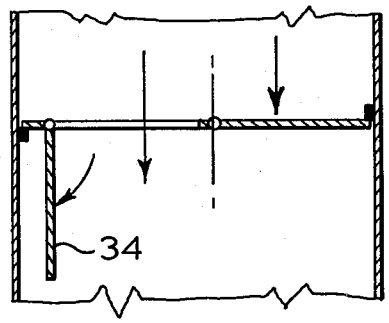

Attention is directed to FIG. 3, which shows the basic configuration of the panel 20 and the flap 34 when in the closed position with the solenoid 64 deactivated. Upon activation of the solenoid, the flap 34 is permitted to open downstream as shown in FIG. 4, and this causes a counterclockwise turning moment on the panel 20 as a whole. The broken line representation in FIG. 5 shows the panel 20 with the partly-open flap 34 in an intermediate position in its clockwise rotation as seen from above, while the solid-line position of FIG. 5 shows the panel 20 when it reaches the final position in its clockwise rotation after actuation of the solenoid 64. It will be seen that, in this final or end position, the flap 34 is again closed with respect to the panel 20. So long as the solenoid 64 remains actuated, the terminal portion 68 of the L-shaped second finger 46 will remain in place on the upstream side of the flap 34 (the rightward side in the solid line representation of FIG. 5), and will prevent the flap 34 from swinging through its closed position under the exertion of pressure from the air flowing in the duct. The terminal position of the damper in the open condition, as seen in solid lines in FIG. 5, is determined by the position of the stop member 66 illustrated in FIG. 1.

Figure 6:
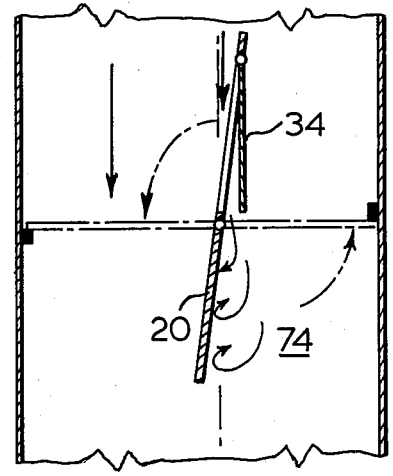

If the solenoid 64 is now deactivated, the pin 26 will be allowed to drop, which will cause the pivotal member 40 to move back down counterclockwise as seen in FIG. 1, simultaneously placing the first finger 44 and the spring finger 50 in the way of the flap 34, and withdrawing the terminal portion 68 of the L-shaped second finger 46 from its position of interference with the flap 34. Since the effect of the air moving through the duct is to place a slightly higher pressure on the left of the flap 34 as seen in FIG. 5 than exists on the right of the flap, and also due to the slight urging exerted by the spring finger 50 against the spring member 51, the deactivation of the solenoid 64 will cause the flap 34 to open slightly as seen in FIG. 6. Flap 34 will then no longer be receiving a differential pressure as a result of the moving air in the duct, and in addition the particular configuration of the panel 20 and flap 34 will cause a slightly negative pressure to the right of the downstream-projecting portion of the panel 20 in the area identified by the numeral 74, which will "draw" the panel 20 back toward and through a dead-center position (normal to the frame), thus causing the flap 34 to close into the same position with respect to the panel 20 as is shown in FIG. 1. Since the pivotal member 40 is now in its first position, the flap 34 is not permitted to pass through the co-planar condition, and will now "catch" the air moving in the duct in such a way as to swing the entire panel back to the closed position.

The activation and deactivation of the solenoid 64 can easily be controlled by a conventional thermostat or humidstat located in the area for which the temperature or air conditions are to be controlled.

It will thus be seen that there has been provided a simple, easily activated damper for forced air systems, which does not require the provision of an electric motor for damper movement.

It will also be appreciated that the solenoid 64 may be replaced by other suitable components, such as hydraulic components, air-operated components, or the like.

What I claim is:
1. A damper for air ducts, comprising:
    frame means,
    a panel rotatable between a closed position and an open position about an intermediate axis fixed with respect to the frame means,
    the panel having, mainly to one side of said axis, a window adapted to be closed and opened by a flap pivoted to said panel, the panel being such that any air pressure differential across said panel exerts a turning moment on the panel portion to said one side of said axis which is greater than that exerted on the panel portion to the other side when the window is closed, and is less when the window is open, and
    flap control means selectively switchable to allow the flap to act as a one-way valve in one direction across the panel, or as a one-way valve in the opposite direction across the panel.

2. The invention claimed in claim 1, in which the window is substantially wholly to one side of the axis, and in which the panel has a greater area to said one side of the axis than to the other, when considering the flap to be closed and part of the panel.

3. The invention claimed in claim 1, in which the flap is pivoted to the panel along a flap edge remote from said axis, and which further includes stop means for limiting the arc of rotation swung through by the panel in moving from the closed position to the open position, said arc being greater than 90° but less than about 125°.

4. The invention claimed in claim 3, in which said flap control means includes a pivotal member movable between a first position and a second position, said member having a first finger which prevents opening of the flap in said one direction when the member is in said first position and does not prevent such opening when the member is in said second position, and a second finger which prevents opening of the flap in said opposite direction when the member is in said second position and does not prevent such opening when the member is in said first position.

5. The invention claimed in claim 4, in which the pivotal member is resiliently biased toward said first position.

6. The invention claimed in claim 5, which further includes solenoid means which, upon electrical energization, moves the pivotal member to said second position and holds it there.

7. The invention claimed in claim 4, in which resilient sealing means are provided on the frame means at locations adjacent the panel edges when the panel is in its closed position.

8. The invention claimed in claim 4, in which the pivotal member further includes a spring finger adapted, when the pivotal member is in said first position, to urge the flap to open partially in said opposite direction, whereby when the panel is in its open position with the pivotal member in said first position, the flap will be partly urged to open in a direction which will induce closing of the panel.

9. The invention claimed in claim 3, in which both the panel and the flap are substantially rectangular.

* * * * *